Patented Apr. 17, 1934

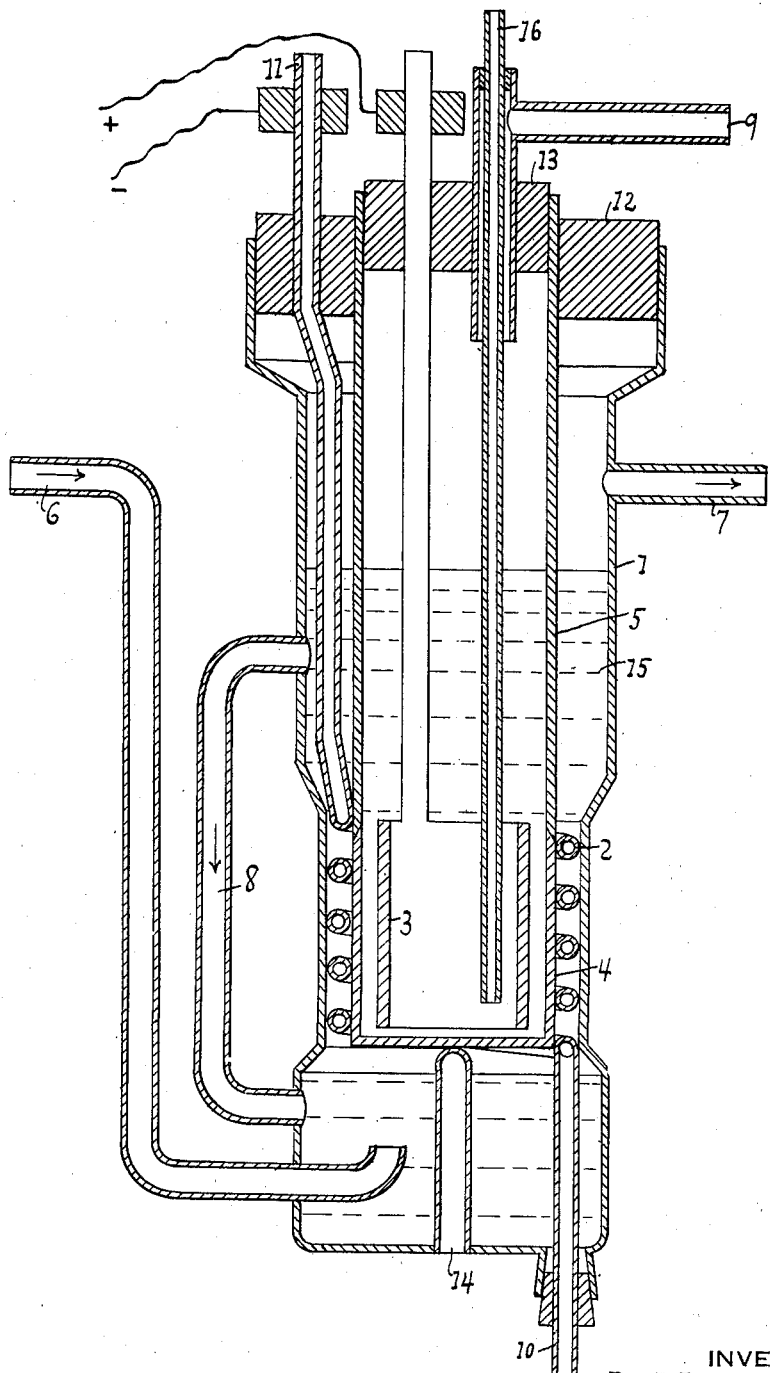

1,955,046

UNITED STATES PATENT OFFICE 1,955,046

PRODUCTION OF BUTADIENE

Paul Baumann, Ludwigshafen-on-the-Rhine, and Helmut Tanneberger, Mannheim, Germany, assignors to I. G. Farbenindustrie Aktiengesellschaft, Frankfort-on-the-Main, Germany Application May 21, 1931, Serial No. 538,978
In Germany May 23, 1930

9 Claims. (Cl. 260—171)

The present invention relates to improvements in the manufacture and production of butadiene.

We have found that the conjugated triple linkages of diacetylene (having the formula $H.C \equiv C.C \equiv C.H$), as such or in dilution with other gases, are converted into ethylene linkages by causing aqueous solutions of compounds of divalent chromium which may be obtained in the usual manner by reducing compounds of this metal having a higher valency, to act on diacetylene. This action is preferably effected in the presence of a substance furnishing hydrogen by interaction with the said chromium compounds, as for example in the presence of acids.

The said compounds of chromium need not be added in the divalent state from the beginning, but it is essential that divalent compounds of chromium are present, at least in an intermediate period of the reaction.

The said conversion of diacetylene is preferably effected, while excluding air or oxygen, in closed vessels which are partly filled with aqueous solutions of the above mentioned compounds of divalent chromium, and in particular the inorganic salts of divalent chromium, the gaseous diacetylene being bubbled through these solutions. It is also possible to shake the diacetylene with or to keep it for a longer time above solutions of the said chromium compounds. The gaseous diacetylene may be blown through such a solution, which is preferably concentrated, with a considerable velocity, say of from 30 to 50 litres per hour with reference to 400 cubic centimetres of a fresh concentrated chromous chloride solution. Since diacetylene is liable to polymerize at elevated temperatures, it is of great importance that the above mentioned conversion be started at room temperature or only slightly elevated temperatures. The reaction takes place with considerable speed. Only a small increase of temperature, as for example from 20° to 30° C., is observed during the reaction, even with large amounts of the reagents, and practically no butanes or butenes or cyclic compounds are formed at all. As the chromous salts may be regenerated by cathodic reduction a given quantity of chromous salt may produce any desired quantity of butadiene. Particularly when working by cathodic reduction, or when introducing hydrogen as such, and more especially so called atomic hydrogen, it may be advantageous to work under pressure, to form the divalent chromium compound.

The process according to the present invention offers an extremely valuable industrial method of converting acetylene into butadiene by first converting acetylene into diacetylene in the manner already known and then converting the diacetylene into butadiene in the manner hereinbefore specified.

The conversion of acetylene into diacetylene, which contrary to expectation proceeds spontaneously with an evolution of heat of 8.8 kilo calories per molecule of diacetylene may be effected for example by leading acetylene over active charcoal at elevated temperatures, such as 500° C., according to Zelinsky (Berichte 57, 1924, page 264) or by way of the copper salt of acetylene according to Straus and Kollek (Berichte 59, 1926, page 1664). Dilute acetylene-containing gases, as for example the gas mixtures obtained by the treatment of methane hydrocarbons in the electric arc, may be employed as the initial gases. The diacetylene already present in these gas mixtures as a by-product may also be directly recovered by fractional distillation.

The following examples will further illustrate the nature of this invention, but the invention is not restricted to these examples. Example 3 is with reference to the accompanying drawing.

Example 1

1 litre of 10 per cent hydrochloric acid and a solution of chromous chloride prepared by dissolving 700 grams of crystalline chromic chloride ($CrCl_3.6H_2O$) in 1200 cubic centimetres of 25 per cent hydrochloric acid with 400 grams of zinc are introduced into a vessel containing 8 litres of diacetylene which has been obtained as a by-product from the treatment of methane in an electric arc by fractional distillation. The color of the chromous chloride solution changes from blue to green when the vessel is shaken. A gas is obtained containing about 60 per cent of butadiene and 40 per cent of vinyl acetylene. The yield of butadiene may be increased until it is practically quantitative by employing larger amounts of chromous chloride solution.

Example 2

Acetylene is led at room temperature into an ammoniacal solution of cuprous chloride, the copper salt of acetylene obtained as a precipitate is converted as described by Straus and Kollek in Berichte der Deutschen Chemischen Gesellschaft, volume 59, (1926), page 1666, with copper chloride and the diacetylene is set free from the resulting copper salt of diacetylene by means of dilute hydrochloric acid. If the diacetylene thus obtained be shaken with a solution of chromous chloride in hydrochloric acid as described in Example 1 butadiene is obtained in the manner described in the said example.

Example 3

In the accompanying drawing an advantageous form of apparatus for carrying out the process according to the present invention in practice is illustrated in elevation and partly in section.

Referring to the drawing 1 is a reaction vessel, 2 is a cathode of pure lead in the form of a spiral. Water for cooling said cathode is introduced at 10 and removed at 11. 3 is an anode, 4 is a diaphragm fitted into a glass tube 5, 6 is a tube for the introduction of diacetylene. 7 is a tube for the removal of reaction products, 8 is a tube for circulating liquid to and from the cathode space. 9 is a tube for the removal of oxygen from the anode space. 12 and 13 are stoppers for closing the cathode and anode spaces respectively. 14 is a closed tube for the insertion of a temperature measuring device. 16 is a tube for drawing off liquid from the anode space or for reintroducing liquid thereto.

An acid solution of a chromic salt is prepared by dissolving 238 parts of pure chromic sulphate having the formula $Cr_2(SO_4)_3.18H_2O$ in 828 parts of water containing an addition of 56 parts of concentrated sulphuric acid. This solution is introduced into the vessel 1 and is reduced electrolytically at the cathode 2 of pure lead, a potential of about 5 volts being maintained in the electrolyte and the current density being about 2.5 amperes per square decimetre of electrode surface. The numeral 15 indicates the said solution. The acid wandering from the cathode space to the anode space during the reduction is continually replenished. Gaseous diacetylene is introduced at 6 and is slowly passed through the solution. A gas is obtained consisting for the most part of butadiene which is withdrawn at 7.

What we claim is:—

1. A process for the production of butadiene, which comprises acting on a gas essentially comprising diacetylene with an aqueous solution of a divalent compound of chromium.

2. A process for the production of butadiene, which comprises acting on a gas essentially comprising diacetylene with an aqueous solution of a divalent compound of chromium in the presence of an acid.

3. A process for the production of butadiene, which comprises acting on diacetylene with an aqueous solution of a divalent inorganic salt of chromium.

4. A process for the production of butadiene, which comprises acting on diacetylene with an acidified aqueous solution of a divalent inorganic salt of chromium.

5. A process for the production of butadiene, which comprises acting on a gas essentially comprising diacetylene with an aqueous solution of a compound of chromium undergoing reduction to the divalent state.

6. A process for the production of butadiene, which comprises acting on a gas essentially comprising diacetylene with an aqueous solution of a compound of chromium undergoing cathodic reduction to the divalent state.

7. A process for the production of butadiene, which comprises acting on a gas essentially comprising diacetylene with an aqueous solution of a compound of chromium undergoing reduction to the divalent state by interaction of an acid with metallic zinc.

8. A process for the production of butadiene, which comprises acting on a gas essentially comprising diacetylene with an aqueous solution of a divalent compound of chromium in starting the reaction at room temperature and not allowing the temperature to increase by more than 30° C.

9. A process for the production of butadiene, which comprises preparing an aqueous acid solution of chromic sulphate, subjecting said solution to cathodic reduction and passing diacetylene therethrough.

PAUL BAUMANN.
HELMUT TANNEBERGER.